United States Patent [19]

Tanaka et al.

[11] Patent Number: 4,782,418

[45] Date of Patent: Nov. 1, 1988

[54] DISC CARTRIDGE

[75] Inventors: Kimio Tanaka; Haruo Shiba, both of Nagano, Japan

[73] Assignee: TDK Corporation, Japan

[21] Appl. No.: 942,623

[22] Filed: Dec. 16, 1986

[30] Foreign Application Priority Data

Dec. 18, 1985 [JP] Japan .............................. 60-194555[U]

[51] Int. Cl.⁴ ............................................. G11B 23/03
[52] U.S. Cl. .................................................... 360/133
[58] Field of Search ................ 360/133; 369/272, 291; 206/444

[56] References Cited

FOREIGN PATENT DOCUMENTS 0137965 4/1985 European Pat. Off. ............ 360/133

Primary Examiner—A. J. Heinz
Attorney, Agent, or Firm—Steinberg & Raskin

[57] ABSTRACT

A disc cartridge capable of not only safely housing a disc in a casing but preventing the disc housed in the casing from being polluted with a foreign matter. The disc cartridge includes a casing formed with a slot and a pair of actuators each having an elongated cover plate member slidably fitted in the slot of the casing in a manner to outwardly projected through the slot. The actuator is provided with an elongated cover plate which is adapted to thoroughly and sealedly cover the slot of the casing.

16 Claims, 5 Drawing Sheets

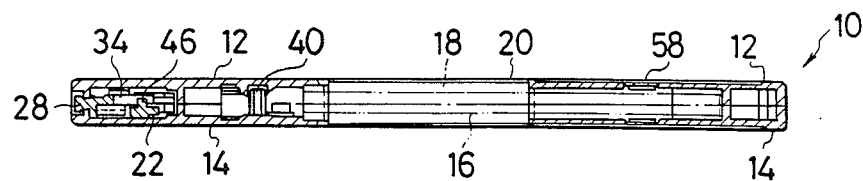
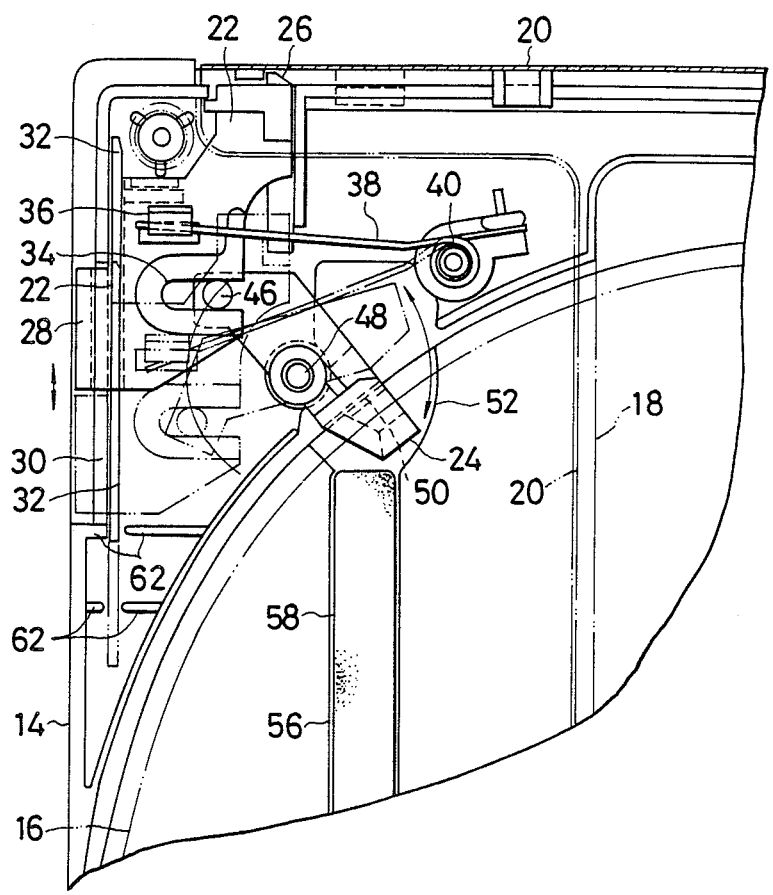

DISC CARTRIDGE

BACKGROUND OF THE INVENTION

1. Field of the Invention

This invention relates to a disc cartridge, and more particularly to a disc cartridge which has a hard disc, particularly, a double-sided type hard disc housed in a casing.

2. Background of the Invention

In general, a disc-type data recording carrier such as a compact disc (CD), a video disc (LD) or the like is used in a manner to be removed from a packing case and set in a recording and/or reproducing equipment.

Conventionally, protection of such a disc type recording carrier from the environment has been desirable because it is not only easy to become covered with dust and damaged but also adversely affected due to a variation in temperature. For this purpose, the use of an envelope such as a tray, a casing or the like has been proposed to protect the disc. Unfortunately, such a conventional envelope is not suitable for the protection of a double-sided hard disc, because the housing of the disc in a storage space defined in the envelope causes the disc to be contacted by the envelope. Also, the formation of a cutout or slot at the envelope which is indispensable to the operation of a disc cartridge results in foreign matter such as dust or the like entering the disc cartridge through the slot to pollute the disc. Further, the envelope causes the disc to be contacted by an inner surface thereof during the storage or transportation. Thus, the use of the envelope results in damage and/or pollution of the disc as well as the exposure of the disc to a variation in temperature.

Accordingly, it would be highly desirable to provide a disc cartridge which is capable of not only safely housing disc in a casing but preventing a foreign matter such as dust or the like from entering the disc cartridge to keep the disc clean in the casing.

SUMMARY OF THE INVENTION

Briefly speaking, in accordance with the present invention, a disc cartridge is provided. The disc cartridge includes a casing comprising an upper cover plate and a lower cover plate joined together to define a space therein, in which a disc is rotatably housed. The casing is provided at each of both sides thereof with a cutout or slot. Also, the disc cartridge includes a shutter arranged to operate at least a window provided at the casing to insert a disc driving mechanism therethrough into the disc cartridge. The casing is provided therein with a pair of actuators each of which is adapted to releasably lock the shutter. The disc cartridge also includes a disc receiver which is arranged in the casing and operatively connected to each of the actuators to selectively receive therein a part of a peripheral portion of the disc. The actuator is provided with actuating means, which are fittedly engaged with the slot of the casing in a manner to be outwardly projected therefrom, so that the actuator may be slidable in a longitudinal direction of the disc cartridge. The actuator is also provided with cover means for thoroughly and sealedly covering the slot of the casing to prevent foreign matter such as dust or the like from entering the casing through the slot.

Accordingly, it is an object of the present invention to provide a disc cartridge which is capable of constantly safely housing a disc in a casing.

It is another object of the present invention to provide a disc cartridge which is capable of constantly keeping a disc clean in a casing.

It is a further object of the present invention to provide a disc cartridge which is capable of effectively preventing foreign matter such as dust or the like from entering the disc cartridge.

It is still another object of the present invention to provide a disc cartridge which is capable of safely housing a disc in a casing without damaging and polluting the disc.

It is yet another object of the present invention to provide a disc cartridge which is capable of ensuring the safety of a recording surface of a disc housed in a casing.

It is still a further object of the present invention to provide a disc cartridge which is capable of preventing unsteadiness of a disc in a casing.

It is yet a further object of the present invention to provide a disc cartridge accomplishing the above-noted objects with a simple structure.

Still other objects and advantages of the invention will be apparent from the specification below.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is made to the following description taken in connection with the accompanying drawings in which like reference numerals designate like or corresponding parts throughout; wherein:

FIG. 2 is a sectional view taken along line II—II of FIG. 1;

FIG. 3 is partly enlarged view showing an actuating section of the disc cartridge shown in FIG. 1;

DETAILED DESCRIPTION OF THE PREFERRED EMBODIMENT

Now, a disc cartridge according to the present invention will be described hereinafter with reference to the accompanying drawings.

Figure 1:
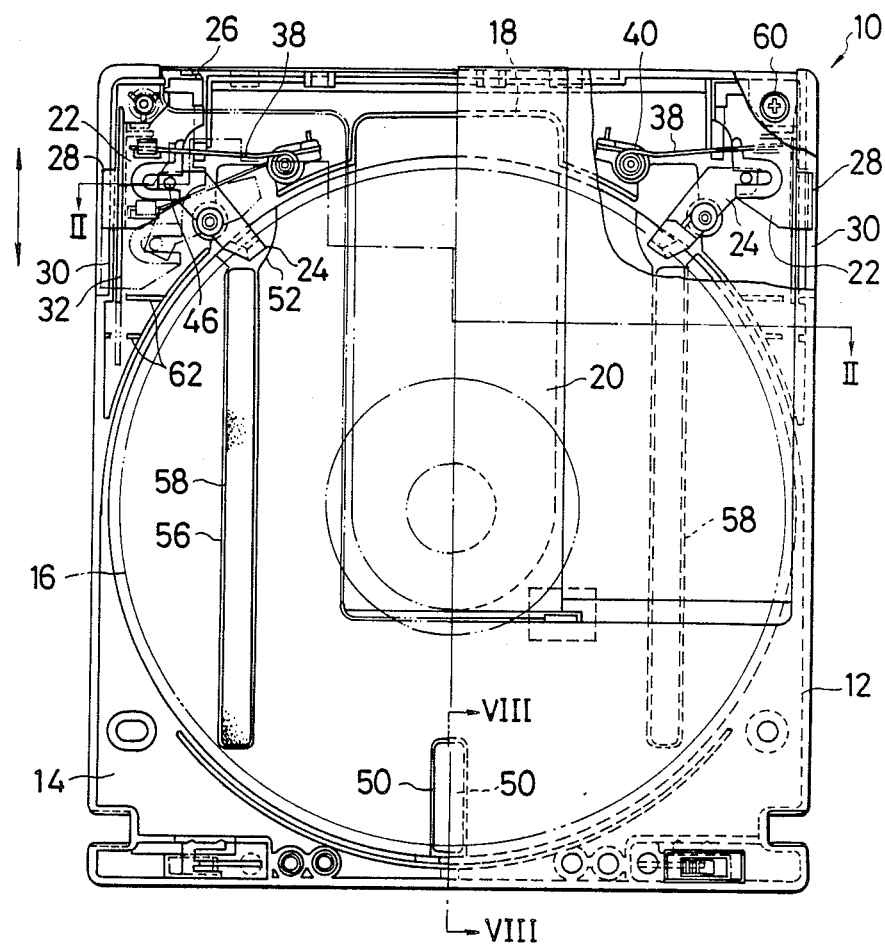
FIG. 1 is a partly cutaway plan view showing an embodiment of a disc cartridge according to the present invention.

FIG. 1 shows an embodiment of a disc cartridge according to the present invention.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the casing 10. The casing 10 is formed with at least a window 18 for inserting a disc driving mechanism of a disc player (not shown) such as a recording and/or reproducing head therethrough into the casing 10. The window 18 is operated by a shutter 20. Also, the disc cartridge includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive a part of a peripheral portion of the disc 16 or a part of each of upper and lower surfaces and a peripheral end surface of the disc 16, as described hereinafter. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved; so that when the shutter 20 is actuated to close the window 18, the disc receiver 24 may be engaged with the disc 16 or insert therein a part of the disc to force it toward a rear side end of the casing 10 while holding it at the center of the casing in a width direction of the casing, to thereby keep it at a state of floating in the space defined in the casing 10, whereas when the shutter 20 is actuated to open the window 18, the disc receiver 24 may be disengaged from the disc 16 to prepare the disc for engagement with a disc driving mechanism of a disc player which is then inserted through the opened window into the cartridge.

In the illustrated embodiment, the shutter 20 comprises a plate member of a substantially U-shape which is movably fitted on the casing 10 so as to be slidable along the upper and lower cover plates 12 and 14.

Figure 4:
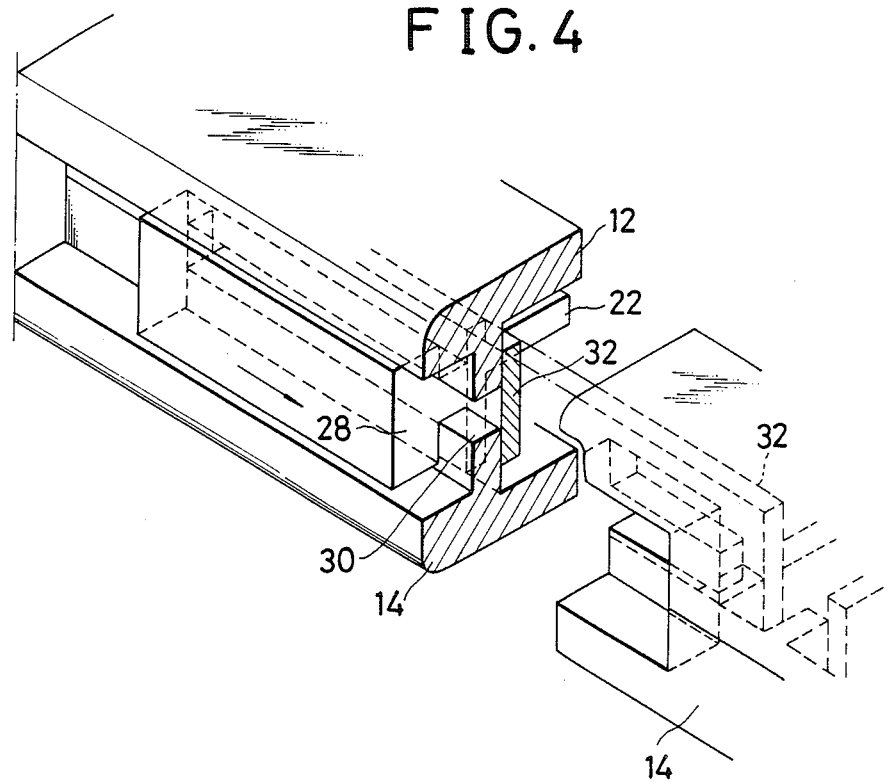
FIG. 4 is a fragmentary perspective view in section showing a part of an actuator.
Figure 5:
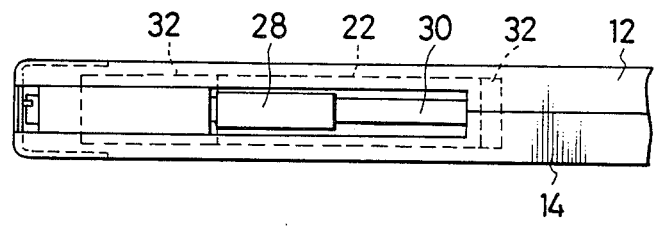
FIG. 5 is a fragmentary side view showing a part of a disc cartridge of the present invention.

A pair of the actuators 22, as shown in FIG. 1, are formed so as to be symmetrical with each other and arranged adjacent to both sides of a front portion of the casing 10 in a manner to be not only opposite to each other but symmetrical along a longitudinal axis of the cartridge and slidable with respect to the casing 10. Also, the actuators each serves as an actuating lever to actuate operation sections of the disc cartridge. More particularly, each of the actuators 22, as shown in FIG. 3, is provided at a front end thereof with lock means 26, which comprise, in the illustrated embodiment, a hooklike member integrally formed at the front end of the actuator 22 and securely engaged with the shutter 20. The actuator 22, as shown in FIGS. 4 and 5, is also provided on one side or an outer side thereof with actuating means 28 which comprise, in the illustrated embodiment, a projection integrally formed on the outer side of the actuator and outwardly extending through a horizontally extending cutout or slot 30 formed in a side wall of the casing 10. Also, the actuator 22, as shown in FIGS. 4 and 5, has cover means 32 integrally provided on the one side thereof so as to extend in a longitudinal direction thereof. The cover means 32 are formed to thoroughly and sealedly cover the slot 30 irrespective of any sliding movement of the actuator 22 to function as a dust protective cover for preventing foreign matter such dust or the like from entering the casing 10 through the cutout 30. For this purpose, in the illustrated embodiment, the cover means are formed into an elongated plate-like shape and arranged to cover the slot 30 at an inside of the casing 10. In addition, the actuator 22 is formed on the other side or an inner side thereof with a guide groove 34 of a substantially U-shape which serves as a movement transmission means for transmitting sliding movement of the actuator to the disc receiver 24 as described hereinafter. Further, the actuator 22 is provided on an upper surface thereof with a spring bearing member 36 as shown in FIG. 3 which is engaged with one end of a spring 38 held at the other end thereof on a spring holder 40 fixed on the casing 10, so that the actuator may be constantly forced toward a front end of the casing.

Figure 6:
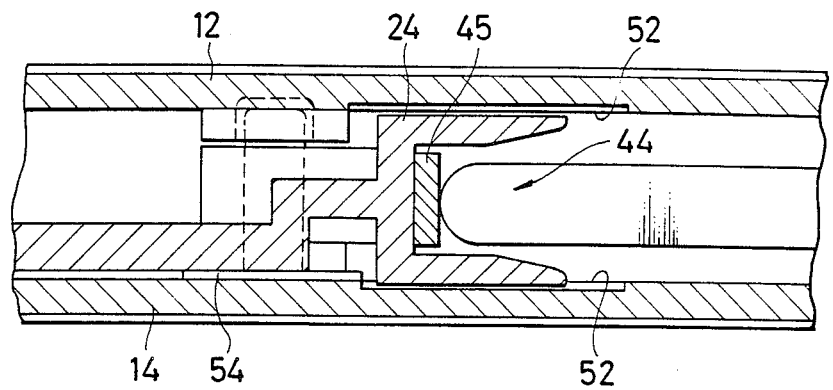
FIG. 6 is a sectional view showing a receiver body of a disc receiver.
Figure 7:
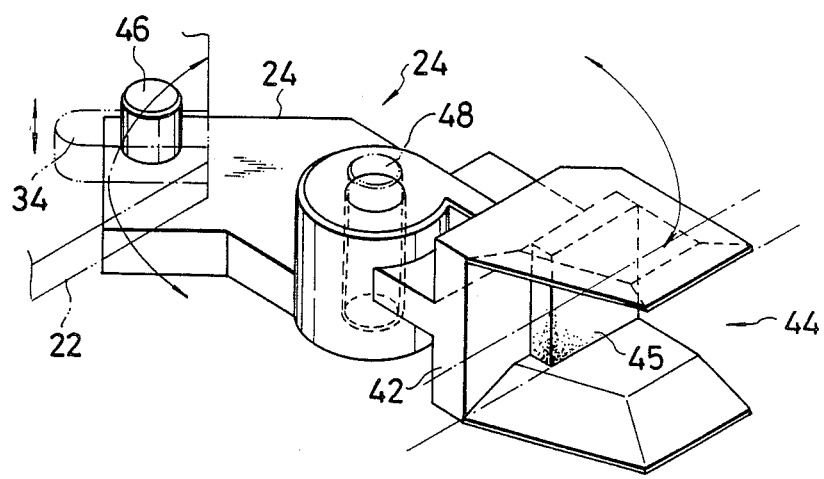
FIG. 7 is a perspective view showing a disc receiver.

A pair of the disc receivers 24, as shown in FIG. 1, likewise are formed in a manner to be symmetrical with each other. Each of the disc receivers 24 is generally formed into a liver-like shape as shown in FIGS. 1, 3 and 7 and provided at one end thereof with a receiver body 42. The receiver body 42 is formed into a substantially sideways U-shape to define therein a recess designated at reference numeral 44 in FIG. 6. The recess 44 is provided on an end surface thereof contacting with a peripheral end portion of the disc 16 with an elastic member 45 to prevent unsteadiness and/or damage of the disc 16 in the disc receiver 24. The elastic member 45 may be formed of rubber or a soft plastic material such as polyethylene, polypropylene or vinyl chloride. Such an elastic member may be arranged on upper and lower surfaces of the recess 44 of the receiver body 42. The recess 44 of the receiver body 42, as shown in FIG. 6, is preferably formed in a manner such that an opened end portion or inlet portion thereof is vertically enlarged so as to facilitate the insertion and removal of a disc 16 with respect to the recess 44.

The so-formed receiver body 42 is positioned adjacent to a peripheral portion of the disc 16 to selectively receive a part of the peripheral portion in the recess 44 depending upon the sliding movement of the actuator as indicated at solid lines and two-dot chain lines in FIGS. 1 and 3 and also act as an elevator for lifting the disc 16. More particularly, the disc receiver 24 is also provided at the other end thereof with a guide pin 46 acting as operative connection means, which is loosely fitted in the guide groove 34 of the actuator 22 to operatively connect the disc receiver 24 to the actuator 22. The disc receiver 24 is movably supported at a middle portion thereof on a pivot pin 48 so as to be rotatable about the pin 48 and vertically movable along the pin 48.

In the illustrated embodiment, the guide pin 46 is provided at the disc receiver 24 and the guide groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

Figure 8:
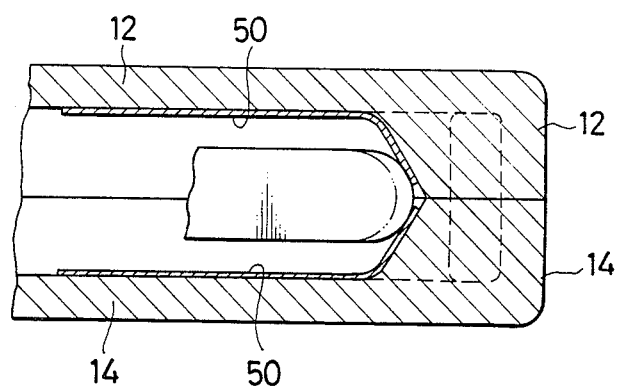
FIG. 8 is a sectional view taken along line VIII—VIII of FIG. 1.

Further, in the illustrated embodiment, the casing 10 is formed at a rear end thereof into a substantially sideways V-shape as shown in FIG. 8, so that the rear end may be tapered. Such construction facilitates the positioning of the disc 16 at the center of the casing 10 in a width direction of the casing because the positioning is carried out while the disc 16 is guided along the tapered rear end. This results in the disc 16 being located at positions indicated at two-dot chain lines and solid lines in FIG. 8 when the disc cartridge is charged in a disc player and removed therefrom, respectively. Also, the casing 10 may have a disc holding material 50 applied to the tapered rear end thereof to ensure the safety and smooth operation of the disc in the casing 10. For this purpose, the disc holding material 50 is preferably a material which is capable of exhibiting lubricating properties, such as ultra-high-molecular-weight polyethylene, ultra-high-molecular-weight polyethylene foam, PET, metal sheet such as stainless steel and the like. Such a material likewise may be applied to portions of the casing 10 adjacent to the tapered rear end as shown in FIG. 8.

The casing is formed on each of upper and lower surface sections of an inner surface thereof with a pair of recesses 52 so as to positionally correspond to the disc receivers 24. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designate bolts and ribs, respectively. In the illustrated embodiment, the ribs are arranged to provide a path through which the cover means 32 are effectively and positively slided, to thereby ensure the covering of the slot 30 with the cover means 32. Alternatively, such a path may be defined by a groove formed on a bottom of an inner surface of the casing.

Now, the manner of operation of the disc cartridge of the illustrated embodiment constructed as described above will be described hereinafter with reference to FIGS. 1 to 8.

When the disc cartridge is inserted in a disc player (not shown) for the operation, the actuating means or projection 28 of the actuator 22 projecting through the cutout or slot 30 of each of the side walls of the casing 10 are engaged with a projection provided at an insertion port of the disc player to be rearwardly slided in the slot 30 along the slot 30 against the spring 38 and the cover means 32 sealedly covers the slot 30 of the casing 10. The sliding of the projection 28 causes the shutter 20 to be released from the lock means or hook-like member 26, so that the shutter 20 may be moved in a direction of opening the window 18 by means of a shutter actuating mechanism of the disc player. Concurrently, the disc receiver 24 is pivotally moved about the pivot pin 48 due to the sliding of the actuator 22 to release the disc 16 from the recess 44, resulting in the disc 16 being safely supported on the lubricating sticked sheets 58 and then operatively engaged with a disc driving mechanism of the disc player.

When the disc cartridge is to be removed from the disc player, the disc 16 is first disengaged from the disc driving mechanism of the disc player to be put on the lubricating sticked sheets 58 and then the shutter 20 is moved by means of the shutter actuating mechanism of the disc player to close the window 18. Then, the disc cartridge is removed from the disc player, so that the actuator 22 may be slided toward the front end of the disc cartridge by means of the spring 38 to actuate the disc receiver 24, to thereby fit a part of the disc 16 in the receiver body 42. This results in the disc 16 being forced toward the rear end of the casing 10 while being held at a state of floating in the the space defined in the casing 10. Simultaneously, the lock means 26 of the actuator 22 actuates to keep the shutter 20 closed. During the whole operation of the disc cartridge, the cover means 32 thoroughly and sealedly cover the slot 30 of the casing to prevent dust or the like from entering the casing.

As can be seen from the foregoing, the present invention is constructed in the manner that the actuating means of the actuator are fittedly and slidably engaged with the slot of the casing in the manner to be outwardly projected therefrom to slide the actuator through the actuating means and slot, and the cover means of the actuator thoroughly and sealedly cover the slot, so that the cover means may constantly cover the slot irrespective of the sliding movement of the actuator. Accordingly, it will be noted that the present invention not only safely houses the disc in the casing but keep the disc clean in the casing.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising:
    a casing comprising an upper cover plate and a lower cover plate joined together to define a space therein, and said casing having sidewalls;
    a disc rotatably housed in said space of said casing;
    a shutter for opening and closing at least one window provided in said casing to allow inserting of a disc drive mechanism of a disc player therethrough into said disc cartridge;
    actuator means slidably arranged in said casing and engaged with said shutter to releasably lock said shutter;
    a disc receiver operatively connected to said actuator means to be selectively moved from a position remote from said disc to a position which receives therein a part of a peripheral portion of said disc, said disc receiver being arranged in said casing;
    a slot formed in at least one of said side walls of said casing;
    said actuator means being fittedly and slidably engaged with said slot of said casing so as to be outwardly projected through said slot to ensure the sliding movement of said actuator means; and
    cover means arranged for constantly sealedly covering said slot of said casing during both use and nonuse of said casing.

2. A disc cartridge as defined in claim 1, wherein said cover means are provided at said actuator.

3. A disc cartridge as defined in claim 2, wherein said cover means are formed into an elongated plate shape sufficient to thoroughly cover said slot irrespective of any position of said actuator means.

4. A disc cartridge as defined in claim 2, wherein said cover means are formed integral with said actuator means.

5. A disc cartridge as defined in claim 1, wherein said cover means are movably supported in a path.

6. A disc cartridge as defined in claim 5, wherein said path is defined by ribs provided in said casing.

7. A disc cartridge as defined in claim 1, wherein said path is defined by a groove formed on said casing.

8. The cartridge of claim 1, wherein said actuator means additionally comprise lock means for locking said shutter in closed position during the nonuse of said cartridge, said lock means comprising a hook-like member formed at a front end of said actuator means which is securely engaged with said shutter during the nonuse of said cartridge.

9. The cartridge of claim 1, wherein said covering means are slidably disposed along an inner surface of said casing side walls having said slot formed therein, so that said slot is always covered during said use and nonuse of said cartridge.

10. The cartridge of claim 9, wherein said window is provided in a front wall of said casing, and said sidewalls extend between said top and bottom plates laterally from said front wall.

11. The cartridge of claim 1, wherein said actuator means comprise a projection integrally formed on an outer side thereof and outwardly projecting from said slot, and being slidably disposed along said slot, whereby said projection is rearwardly slid along said slot by a projection provided at an insertion port of the disc player, when said cartridge is inserted into the player for use.

12. The cartridge of claim 1, additionally comprising a pair of slots, each being formed in a respective side wall of said cartridge,
said actuator means comprise a pair of actuators, each being slidably engaged with a respective slot, and
said cover means comprise a pair of covers, each being arranged for constantly covering a respective slot.

13. The cartridge of claim 1, wherein said disc receiver is pivotally mounted upon said casing, and comprises a recess at one end thereof for receiving the disc during the nonuse of said cartridge, and
said actuator means comprise a guide groove at a side opposite said cover means for transmitting sliding movement of said actuator means to said disc receiver.

14. The cartridge of claim 13, wherein said disc receiver comprises a guide pin mounted on an opposite end from said recess, for engagement with said guide groove.

15. The cartridge of claim 13, additionally comprising a spring holder fixedly mounted upon said casing,
a spring bearing member provided on an upper surface of said actuator means, and
a spring engaged at one end thereof with said holder and at an opposite end thereof with said bearing member, for biasing said actuator means towards a front of said casing during the nonuse of said cartridge.

16. The cartridge of claim 15, additionally comprising a rear end of said space being tapered between said upper and lower plates into a substantial V-shape, for facilitating positioning of the disc during the use of said cartridge.

* * * * *